(12) United States Patent
Watkins

(10) Patent No.: US 6,542,196 B1
(45) Date of Patent: Apr. 1, 2003

(54) ADAPTIVE FIELD PAIRING SYSTEM FOR DE-INTERLACING

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/435,184

(22) Filed: Nov. 5, 1999

(51) Int. Cl.[7] .................................................. H04N 7/01
(52) U.S. Cl. ...................................... 348/448; 348/452
(58) Field of Search ................................ 348/448, 452, 348/441; H04N 7/01

(56) References Cited

U.S. PATENT DOCUMENTS 6,118,488 A * 9/2000 Huang ........................ 348/448
6,269,484 B1 * 7/2001 Simsic et al. ............... 348/448
6,348,949 B1 * 2/2002 McVeigh ..................... 348/448

* cited by examiner

Primary Examiner—Sherrie Hsia
(74) Attorney, Agent, or Firm—Christopher P. Maiorana, PC

(57) ABSTRACT

A method for de-interlacing a decoded video stream comprising the steps of (A) defining a sampling period, (B) sampling the decoded video stream during the sampling period to define one or more parameters, (C) adjusting a threshold and a level of the decoded video stream used in processing, in response to the one or more parameters, (D) filtering the decoded video stream using a filter tool selected from a plurality of filters, in response to the one or more parameters.

20 Claims, 5 Drawing Sheets

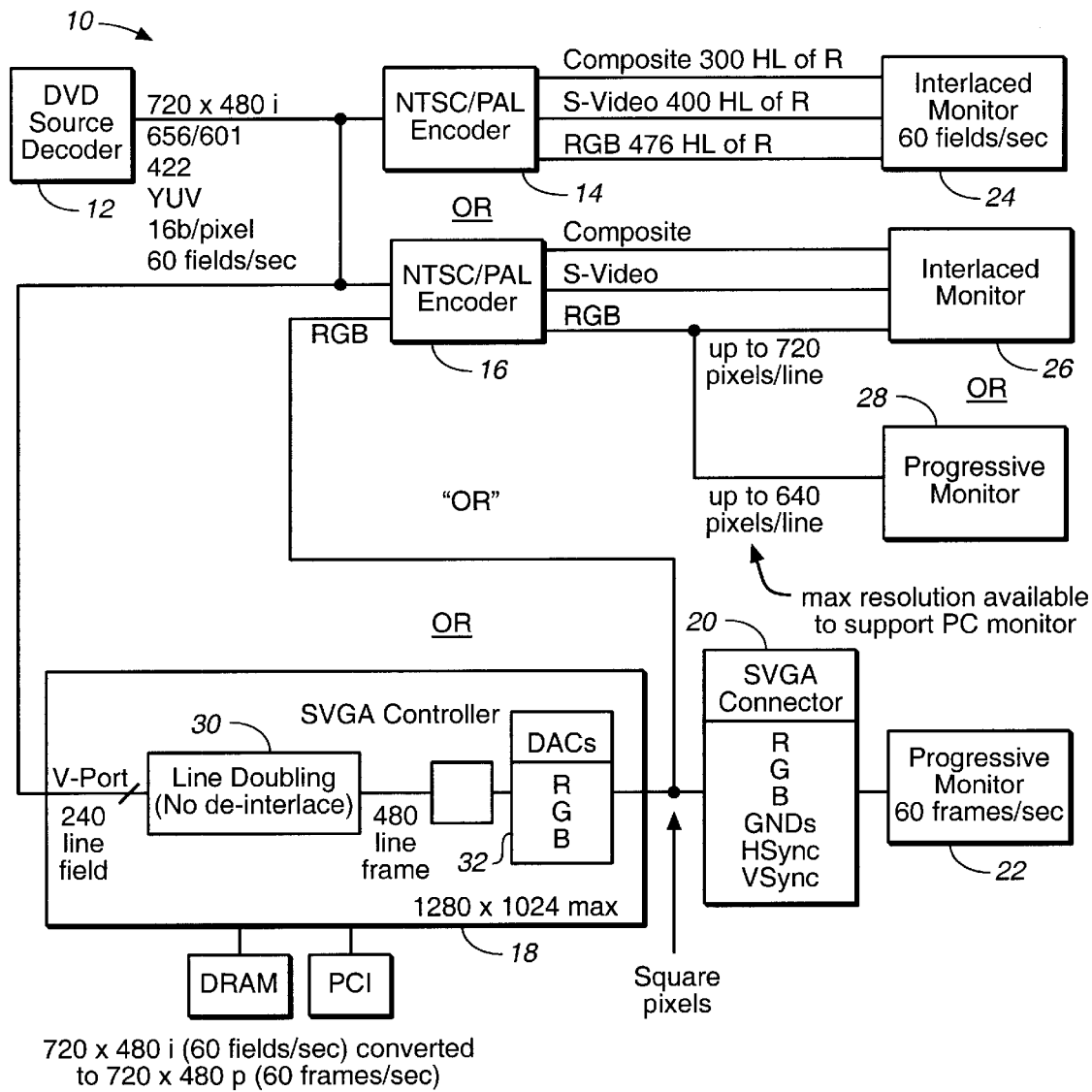
(Conventional)
FIG._1

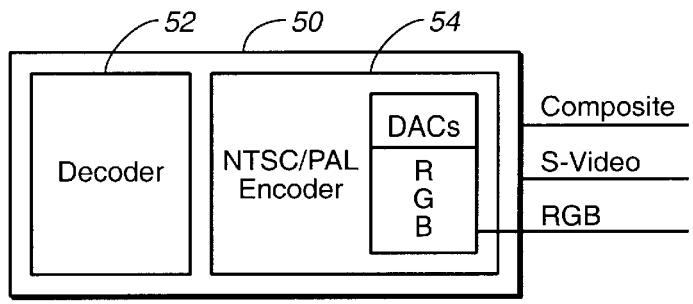
*(Conventional)*
FIG._2
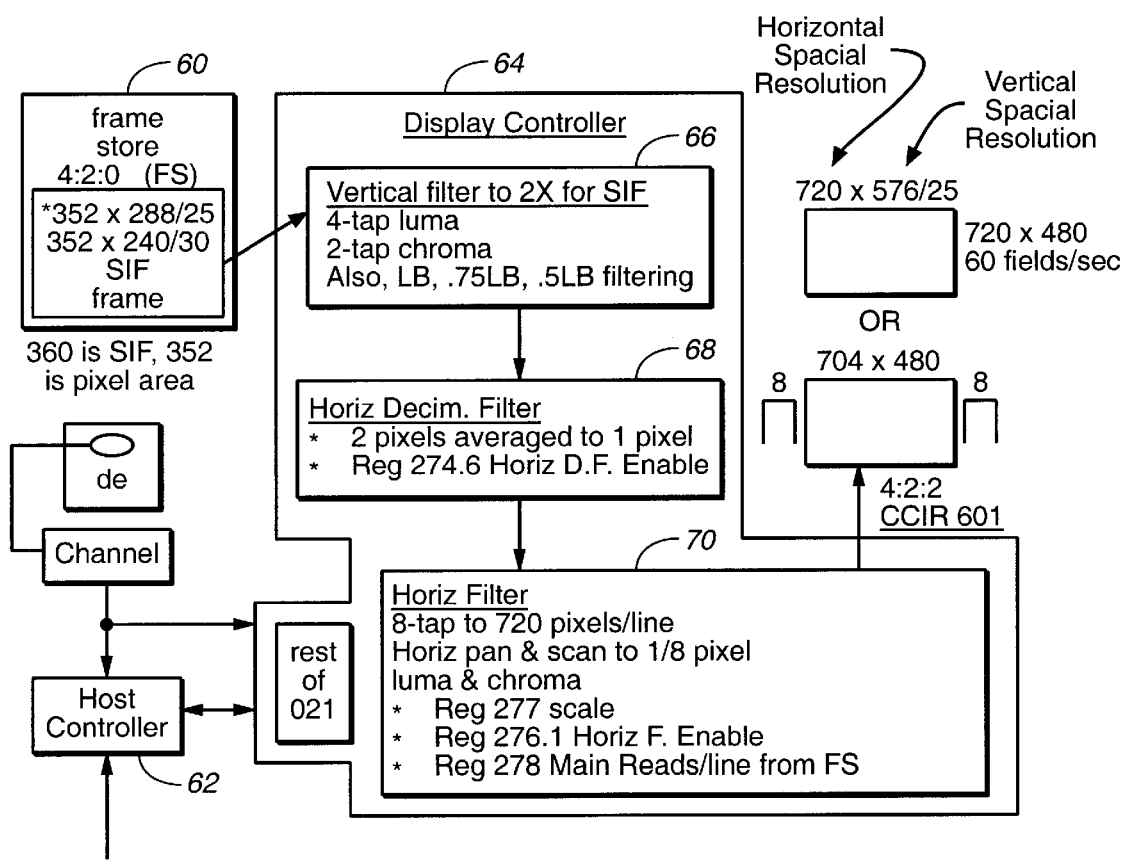
*(Conventional)*
FIG._3

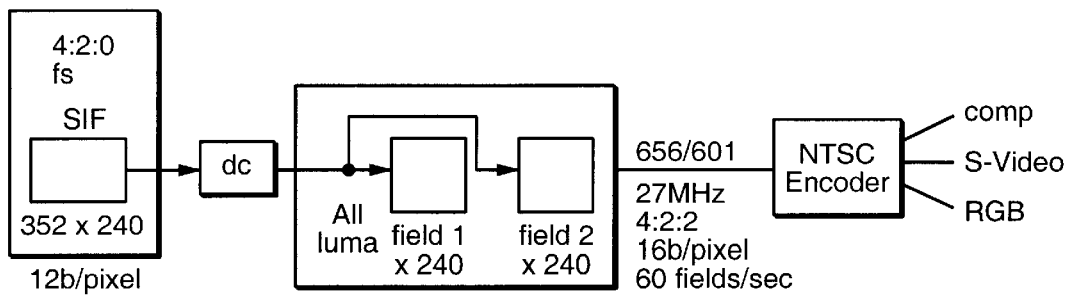
Progressive frame is usually SIF, so first 240 lines go to each field.
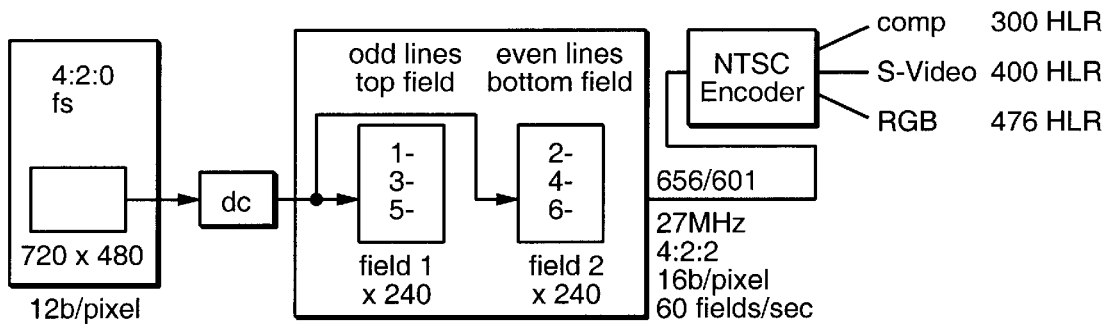
*(Conventional)*
FIG._4
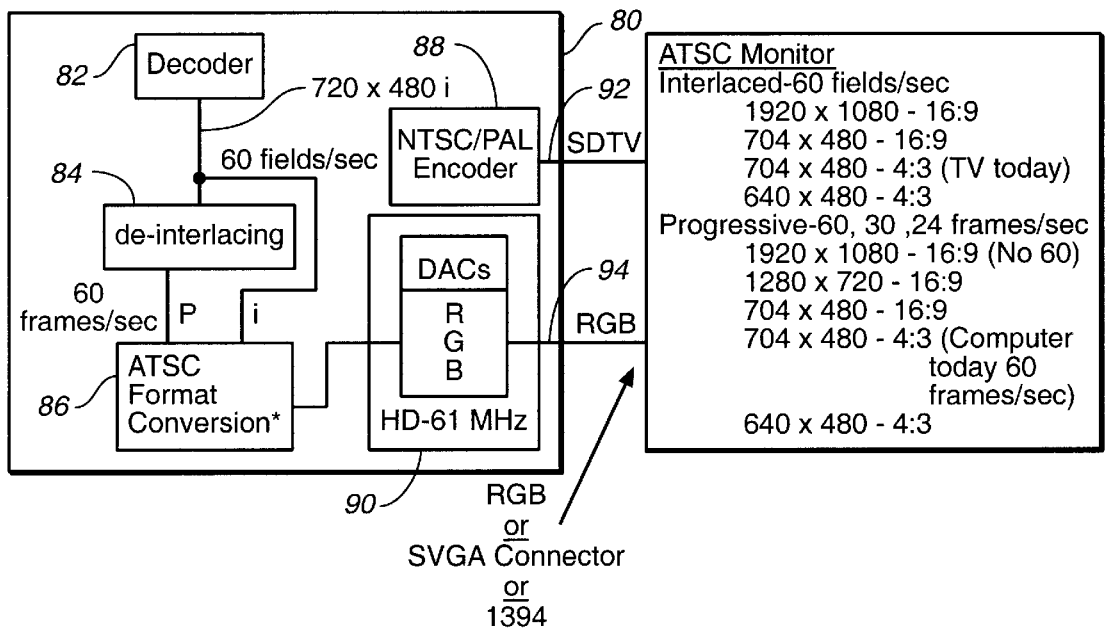
FIG._5

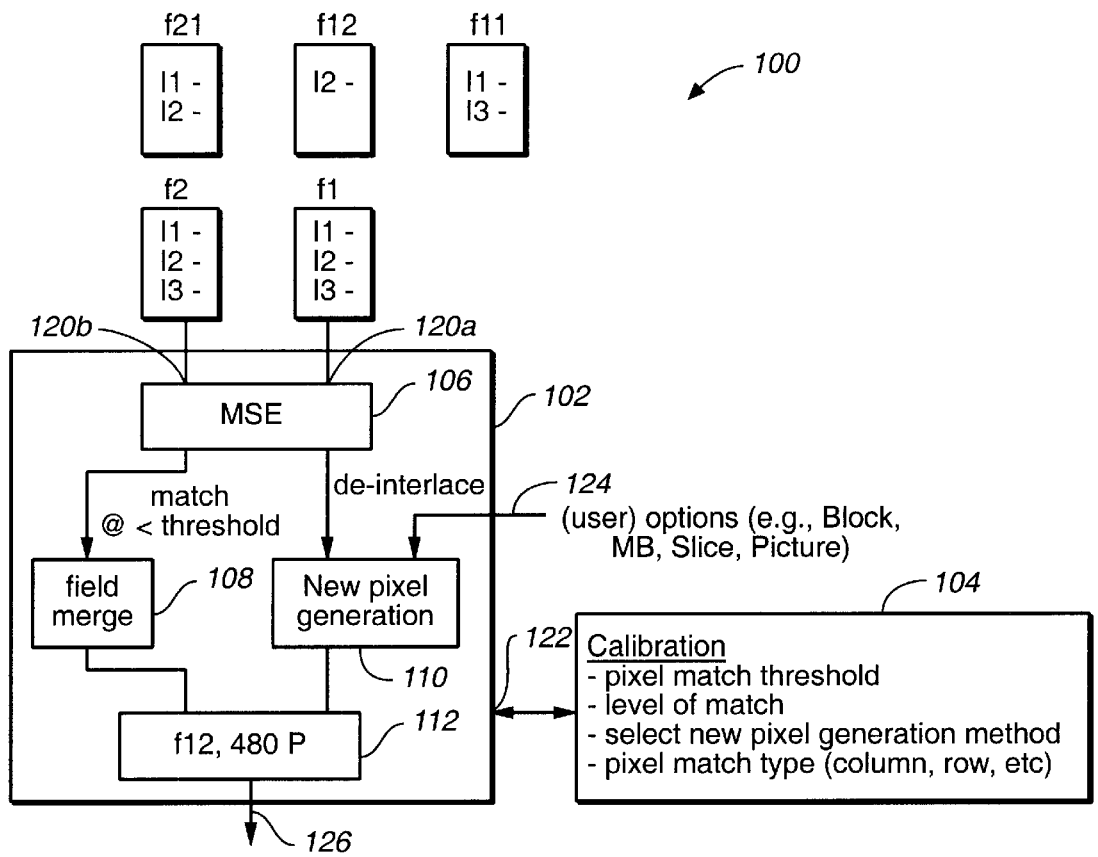
FIG._6
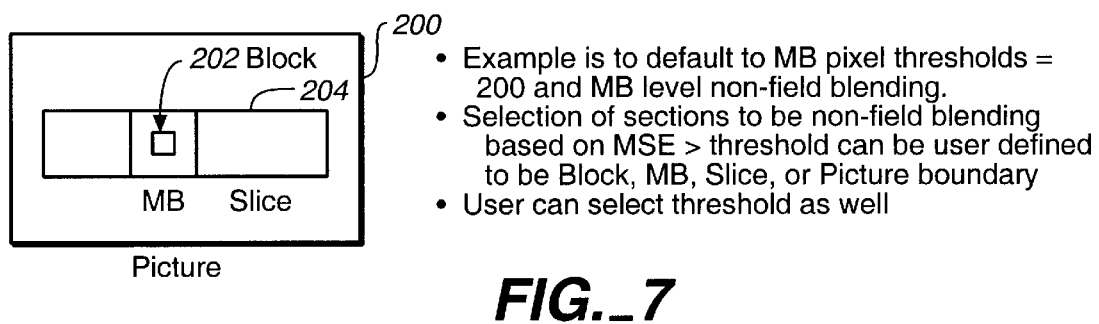
- Example is to default to MB pixel thresholds = 200 and MB level non-field blending.
- Selection of sections to be non-field blending based on MSE > threshold can be user defined to be Block, MB, Slice, or Picture boundary
- User can select threshold as well
FIG._7

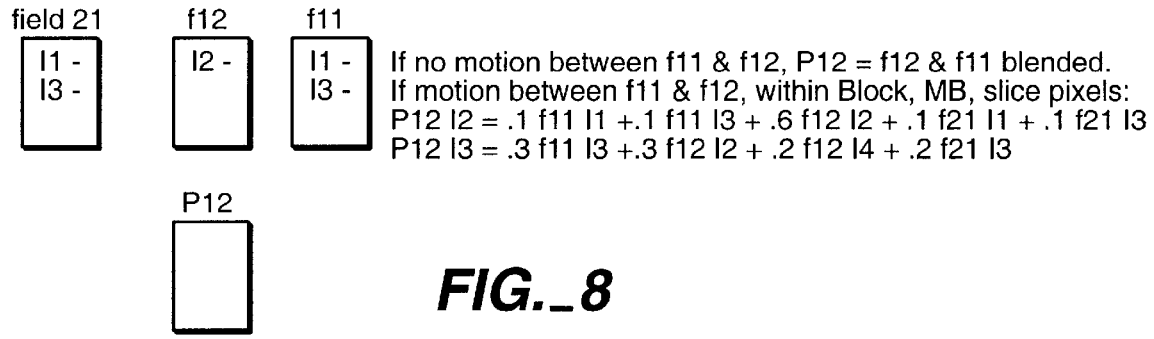

If no motion between f11 & f12, P12 = f12 & f11 blended.
If motion between f11 & f12, within Block, MB, slice pixels:
P12 I2 = .1 f11 I1 + .1 f11 I3 + .6 f12 I2 + .1 f21 I1 + .1 f21 I3
P12 I3 = .3 f11 I3 + .3 f12 I2 + .2 f12 I4 + .2 f21 I3

- l is line
- Only upsample to match display capabilities
- Software loads coefficient into interpolator engine

FIG._9

ADAPTIVE FIELD PAIRING SYSTEM FOR DE-INTERLACING

FIELD OF THE INVENTION

The present invention relates to de-interlacing systems generally and, more particularly, to a system for enabling adaptive field pairing based on predetermined, user defined, and/or auto-calibrated de-interlacing parameters.

BACKGROUND OF THE INVENTION

De-interlacing is necessary to display interlaced source material on a progressive-only display. Also, de-interlacing can remove or reduce interlacing artifacts. Most televisions are interlaced for historic and bandwidth saving reasons, sending fields every 60th of a second, where two fields make up a frame. Most computer monitors are progressive, sending frames every 60th of a second, depending on the particular refresh rate implemented.

Referring to FIG. 1, an example of a conventional de-interlacing system is shown. The system 10 generally comprises a source decoder 12, an encoder 14, an encoder 16, a circuit 18. The circuit 18 may present signals to an SVGA connector 20. The SVGA connector 20 is connected to a progressive monitor 22 that can display 60 frames per second. The encoder 14 presents either a composite signal, an S-video signal or an RGB signal. The composite, S-video or RGB signal is presented to an interlaced monitor 24. The encoder 16 presents either a composite, an S-video or an RGB signal to an interlaced monitor 26. Additionally, the RGB signal is presented to a progressive monitor 28. The circuit 18 includes a line doubler 30 and a RGB conversion circuit 32. The circuit 18 is an SVGA controller.

Referring to FIG. 2, an example of a next generation decoder 50 is shown. The decoder 50 comprises a decoder portion 52 and an encoder portion 54. The encoder 54 is an NTSC/PAL encoder with integrated digital-to-analog conversion and RGB outputs.

Referring to FIG. 3, a conventional method for presenting various screen formats is shown. A frame storage circuit 60 stores a variety of frames in a 4:2:0 format. A host controller 62 via the channel, presents a MPEG2 sequencing picture header for vertical resolution, horizontal resolution, pictures/second, aspect ratio and programming/interlacing. A display controller 64 includes a vertical filter 66, a horizontal decimal filter 68 and a horizontal filter 70.

Referring to FIG. 4, a conventional display controller implementing progressive and interlaced handling is shown. A field is sent every 1/60th of a second to an NTSC encoder. The NTSC encoder is programmed for interlacing only. The progressive frame is normally implemented as a SIF, such that the first 240 lines are presented to each field. SIF is Source Input Format, a derivative of the CCIR 601 format for video frames. The interlace frame is made up of two×240 line fields with temporal displacement. The host controller enables parsing of the sequence header of an MPEG bit stream for (i) vertical resolution, (ii) horizontal resolution, (iii) pictures/second, (iv) 4:3 or 16:9 aspect ratio selection, and (v) progressive or interlaced, (in picture header also). An MPEG1 bitstream is always progressive, SIF, 1.5 Mb/sec, and 4:2:0. An MPEG2 bitstream is progressive or interlaced, frame pictures, field pictures or 2-field pictures.

The various conventional de-interlacing methods shown in FIGS. 1–4 each require one or more of the following (i) adding the odd and even fields together to create a progressive frame; (ii) choosing either a first field or a second, double the number of lines, and using the combination as a progressive frame; (iii) vertical filtering nearby lines to create a missing line; (iv) vertical temporal filtering (this is (iii) plus temporal filtering from adjacent fields); (v) adaptive motion compensation (i.e., using the current field compared to the previous first or second fields on a pixel by pixel basis); and (vi) traditional adaptive field pairing (i.e., if no motion-field merge, if motion-vertical temporal filtering of entire frame).

The disadvantages with conventional de-interlacing methods (i) is if there is movement between the fields, jagged edges may result; (ii) is use of only one-half the vertical information available, if 30 frames/sec, or if 60 frames/sec, flicker can occur since there are fill lines, (iii, iv, v) is lack of use of field merge, and (vi) is visible switching between types, especially around the motion threshold.

SUMMARY OF THE INVENTION

One aspect of the present invention concerns a method for de-interlacing a decoded video stream comprising the steps of (A) defining a sampling period, (B) sampling the decoded video stream during the sampling period to define one or more parameters, (C) adjusting a threshold and a level of the decoded video stream used in processing, in response to the one or more parameters, (D) filtering the decoded video stream using a filter tool selected from a plurality of filters, in response to the one or more parameters.

Another aspect of the present invention concerns a method for de-interlacing a decoded video stream having a plurality of frames comprising the steps of (A) comparing a first one of the plurality of frames with a next one of the plurality of frames, (B) if the first frame and the next frame are within a predetermined criteria, simultaneously displaying the first frame and the next frame as a progressive frame and (C) if the first frame and the next frame are not within a predetermined criteria, filtering the next frame.

The objects, features and advantages of the present invention include providing a de-interlacing system that may implement (i) user defined de-interlacing parameters, (ii) auto-calibration of de-interlacing, (iii) auto-calibration that may be re-done at programmed points in the video stream or at points after which some parameter has been achieved (e.g., eight fields in a row with maximum number of pixel deltas), (iv) extensive de-interlacing parameter options, (v) user defined or auto-calibration gauges as to when to vertically filter or not vertically filter the rest of the group, (vi) "softer" tap filtering at boundaries of vertically filtered and not vertically filtered groups, and/or (vii) an encoder that may be enabled to provide information in interlaced fields that enable low-cost, accurate, de-interlacing at the decoder.

BRIEF DESCRIPTION OF THE DRAWINGS

These and other objects, features and advantages of the present invention will be apparent from the following detailed description and the appended claims and drawings in which:

FIG. 1 is a block diagram of a conventional source decoder display de-interlacing system;

FIG. 2 illustrates a conventional decoder with integrated RGB;

FIG. 3 illustrates a conventional method for presenting various screen formats;

FIG. 4 illustrates a conventional display controller implementing progressive and interlaced handling;

FIG. 5 illustrates a DTV compatible decoder in accordance with the present invention;

FIG. 6 is an example of a preferred embodiment of the present invention;

FIG. 7 is an example of non-field blending vertical filtering;

FIG. 8 illustrates an example of selection between fields; and

FIG. 9 illustrates an example of a 480i to 1080i luma scaling example.

DETAILED DESCRIPTION OF THE PREFERRED EMBODIMENTS

Most consumer video equipment, such as DVD players, currently support interlaced displays. In the future, all consumer video equipment will need to support progressive displays. The present invention implements a system for de-interlacing an interlaced source. The present invention may enable construction of a series of progressive frames from a series interlaced fields. The present invention may be implemented as an upgrade, or supplement, to traditional adaptive field pairing techniques.

The present invention may implement a method, software and/or architecture for implementing (i) field merge when there is no motion between frames (this provides the maximum vertical resolution) and (ii) vertical temporal filtering with programmability and precision when there is motion between frames. Vertical temporal filtering may be used to maximize the vertical resolution and minimize visibility to the types of de-interlacing being used. In the case of a 3:2 pulldown, field merge will generally be implemented, where only the fields from the same frame will be merged. The present invention may enable either (i) system configuration or (ii) user input to define the next frame versus current frame Mean Square Error (MSE) and pixel delta thresholds.

Referring to FIG. 5, an example of the present invention implemented in the context of a digital television (DTV) compatible decoder 80 is shown. The decoder 80 generally comprises a decoder portion 82, a de-interlacing portion 84, an ATSC format conversion circuit 86, an NTSC/PAL encoder 88 and an RGB circuit 90. The encoder 88 may present an SDTV signal at an output 92. The RGB decoder 90 may present an RGB signal at an output 94. The ATSC format conversion circuit 86 and the RGB circuit 90 may present a variety of monitor resolutions.

Referring to FIG. 6, an example of a system 100 is shown implementing an example of the present invention. The system 100 generally comprises a de-interlacing portion 102 and a calibration portion 104. The de-interlacing circuit 102 may comprise a MSE portion 106, a field merge portion 108, a new pixel generation portion 110 and an output portion 112. The MSE portion 106 may have an input 120a and an input 120b that may each receive a series of frames (e.g., f1–fn). The output portion 126 may present a progressive video stream.

The MSE portion 106 may calculate the sum of the differences of the pixels between two frames received at the inputs 120a and 120b. The MSE portion 106 may be used as a preliminary calculation to assess if the currently displayed frame matches the next frame, assuming the next frame is made up of the two next fields merged. If this threshold is not met, the next frame versus current frame pixel deltas are above the pixel delta threshold and are processed further. The next frame pixel locations that are above the pixel delta threshold have new pixel values created based on vertical temporal filtering. Example coefficients are described in connection with FIG. 8. While FIG. 8 illustrates one example, different tap filters may be used and different processing techniques may be used accordingly to meet the design criteria of a particular implementation. In general, the previous field and the next field may be used with the current field to generate the current progressive frame.

The calibration portion 104 may be implemented as a user defined or auto calibration that may sample×seconds of decoded video for a particular criteria. An example of a particular criteria may be maximum motion detection with a threshold of 20/pixel delta. The result of the calibration may be presented to an input 122 and may be used (i) to auto adjust the programming for threshold and level, (ii) to select the best vertical filtering, (iii) to provide de-interlacing of the new pixel generation (e.g., block, macroblock, slice, picture) on all video decoded until the next calibration period. Other example criteria may be (i) minimum motion detection, (ii) set threshold match, (iii) only pixels in column, (iv) different processing select for vertical temporal filtering (including coefficient selection), and (v) sample time. A user input 124 may be used to choose different non-field blending, vertical temporal filtering criteria, etc., based on a particular preference. With more constrained criteria (e.g., threshold of 0/pixel-delta, block level vertical temporal filtering, and 5 tap vertical filtering), more performance and power may be required for the processing. The performance and power conservation value added can be considerable in MPEG2, MPEG4 or other video compression technologies.

If a certain criteria is frequently maximized, the user may be prompted or the system may be configured to automatically engage another calibration. If a higher level of granularity has been chosen (e.g., macroblock level), and a few pixels at that level are above the threshold delta, these few pixels may not need to be vertically filtered, at the option of the user or the calibration. Likewise, if many pixel deltas are above the threshold delta, the rest in the group may be vertically filtered. These methods, along with the MSE portion 106, may ensure switching between types is not visible. Also, on boundaries between groups vertically filtered and groups not vertically filtered, the filtered groups may have "softer" tap filtering to further ensure switching between types is not visible.

The encoder may be enabled to provide information in interlaced fields that easily enable de-interlacing at the decoder. The encoder may embed field motion information that may be used by the de-interlacer to save processing and power. Further, optimum accuracy may be provided if the difference threshold of the encoder is matched with the decoder. Candidate MPEG2 syntax fields to provide this information may be picture temporal scalable extension or picture spatial scalable extension, since MPEG2 decoders do not normally use these fields. For example, just the non-matching pixel addresses on the field (e.g., 720×480) may be listed in scan order. If all pixels have a mis-match, this would be 19-bits of address needed, easily provided by these two fields.

Referring to FIG. 7, an example of a picture 200 is shown. The picture may comprise a block 202 and a slice 204. FIG. 7 illustrates an example where the motion detection granularity can go down to the macroblock level, the lowest level unit of MPEG video compression.

Referring to FIG. 8, an example of motion detection between frames is shown. If no motion between, for example, frame f11 and frame 12 occurs, the progressive frame p12 may be equal to frame f12 and frame f11 blended.

If motion exists between the frame f11 and the frame f12 within the block, MB and slice pixels may be defined by the following equation EQ1:

$$P12|2=0.1f11|1+0.1f11|3+0.6f12|2+0.1f21|1+0.1f21|3$$
$$p12|3=0.3f11|3+0.3f12|2+0.2f12|4+0.2f21|3 \quad \text{EQ1}$$

Referring to FIG. 9, an example of conversion between a 1080i to a 480i frame is shown. Luma is the most important scaling factor. The scaling is done to match the resolution capability of the display. The interpolator engine does the work after a program load of the equation and coefficients.

Auto-calibration may be re-done at programmed points in the video stream or at points after which some parameter has been achieved. For example, 8 fields in a row with maximum number of pixel deltas may be used as calibration points. Alternatively, the user may be prompted at one or more of these points of inflection.

The de-interlacing parameters are then adjusted to reflect the video being decoded.

De-interlacing parameter options may be implemented including (i) pixel comparison threshold, (ii) min/max motion detection overxseconds of video, (iii) hierarchical level of new pixel generation, (iv) different vertical temporal filtering algorithms and (v) sample time. User defined or auto-calibration gauges may be implemented to determine when to vertically filter or not vertically filter the rest of the group (e.g., slice, macroblock, block) that has less than all pixel deltas above the threshold.

"Softer" tap filtering (e.g., less dramatic filtering) at boundaries of vertically filtered and not vertically filtered groups may be implemented. An encoder implementing the present invention may be enabled to provide information in interlaced fields that enable low-cost, accurate, de-interlacing at the decoder. In one example, particular portions of the present invention may be implemented without implementing every feature. For example, auto-calibration for selection of optimum de-interlacing may be independently implemented.

Since most broadcast and stored video media today is interlaced, de-interlacing is necessary. Progressive displays are popular on computers and are leaders in providing higher resolution. Typical de-interlacing approaches today are fixed and static. The present invention provides a dynamic system, that enables de-interlacing options such that optimum operation may be achieved for performance, size and power. Additionally, de-interlacing, with alias biasing and conversion to square pixels, may enable a decoder to support progressive, computer-type monitors, without VGA support. The various aspects of the present invention may be implemented using hardware, software or a combination of both.

While the invention has been particularly shown and described with reference to the preferred embodiments thereof, it will be understood by those skilled in the art that various changes in form and details may be made without departing from the spirit and scope of the invention.

What is claimed is:

1. A method for de-interlacing a decoded video stream comprising the steps of:
    (A) defining a sampling period;
    (B) sampling said decoded video stream during said sampling period to define one or more parameters;
    (C) adjusting a threshold and a level of said decoded video stream used in processing, in response to said one or more parameters;
    (D) filtering said decoded video stream using a filter tool selected from a plurality of filters, in response to said one or more parameters.

2. The method according to claim 1, wherein said selected filter tool is selected in response to a user input signal.

3. The method according to claim 2, wherein said parameters are selected from the group consisting of a block parameter, a macroblock parameter, slice parameter and a picture parameter.

4. The method according to claim 1, further comprising the steps of:
    (B-1) repeating said sampling;
    (C-1) defining another one or more parameters; and
    (D-1) filtering said decoded video stream using a filter tool selected from a plurality of filters, in response to another of said one or more parameters.

5. The method according to claim 1, wherein said one or more parameters are automatically generated.

6. The method according to claim 5, wherein said one or more parameters are automatically generated at one or more predetermined points in the video stream.

7. The method according to claim 6, wherein said one or more parameters are generated at one or more points after a predetermined parameter has been determined.

8. The method according to claim 7, wherein said one or more parameters are adjusted based on the particular video data stream being decoded.

9. The method according to claim 1, wherein said one or more parameters are selected from the group consisting of pixel comparison threshold, min/max motion detection overxseconds of video, hierarchical level of new pixel generation, different vertical temporal filtering, and sample times.

10. The method according to claim 9, wherein step (D) provides a second level of filtering at one or more boundaries a vertically filtered portion of said video stream and a not vertically filtered portion of said video stream.

11. A method for de-interlacing a decoded video stream having a plurality of frames, said method comprising the steps of:
    (A) comparing a first one of said plurality of frames with a next one of said plurality of frames;
    (B) if said first frame and said next frame are within a predetermined criteria, simultaneously displaying said first frame and said next frame as a progressive frame; and
    (C) if said first frame and said next frame are not within the predetermined criteria, filtering said next frame, wherein said predetermined criteria comprises a pixel delta threshold.

12. The method according to claim 11, wherein said step (A) comprises a sum of the differences between one or more pixels of said first frame and one or more pixels of said next frame.

13. The method according to claim 11, wherein steps (B) and (C) are done to ensure switching between frames is not visible, including (i) optional vertical filtering of a small percentage of pixels above a threshold delta, (ii) filtering of all pixels if a majority percentage of pixels is above threshold or (iii) less dramatic filtering of a filtered and a non-filtered group.

14. An apparatus comprising:
    a first circuit configured to test one or more frames of a video stream;
    a second circuit configured to generate a first data stream comprising a plurality of de-interlaced frames in response to one or more interlaced frames that includes frame difference threshold metrics; and
    a calibration circuit configured to control the generation of said first data stream in response to one or more calibration parameters.

15. The apparatus according to claim 14, further comprising:
a display control configured to present a visual image in response to said first data stream.

16. The apparatus according to claim 14, wherein said calibration parameters are automatically generated.

17. The apparatus according to claim 14, wherein said calibration parameters are generated from an external source.

18. The apparatus according to claim 14, wherein said calibration parameters are selected from the group consisting of (i) pixel match threshold, (ii) level of match, (iii) new pixel generation selection, (iv) pixel match and (v) pixel match level.

19. An apparatus comprising:
a first circuit for video encoding configured to provide field motion information;
a second circuit for video decoding configured to use said field motion information to reducing processing needs to provide optimum accuracy in de-interlacing; and
a calibration circuit configured to control the generation of said field motion information in response to one or more calibration parameters.

20. The apparatus according to claim 19, wherein said field motion information includes non-matching pixel addresses between two fields.

* * * * *